United States Patent
Choi et al.

(10) Patent No.: US 8,214,303 B2
(45) Date of Patent: Jul. 3, 2012

(54) APPARATUS FOR EXECUTING INTEROPERABLE DIGITAL RIGHTS MANAGEMENT USING CONTENTS DEVICE AND METHOD OF PERFORMING OPERATIONS BETWEEN CONTENTS DEVICE AND DIGITAL RIGHTS MANAGEMENT TOOL FOR INTEROPERABLE DIGITAL RIGHTS MANAGEMENT

(75) Inventors: Bum-Suk Choi, Daejeon (KR); YoungBae Byun, Seoul (KR); Jooyoung Lee, Seoul (KR); Jeho Nam, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 528 days.

(21) Appl. No.: 12/516,636

(22) PCT Filed: Jul. 5, 2007

(86) PCT No.: PCT/KR2007/003273
§ 371 (c)(1),
(2), (4) Date: May 28, 2009

(87) PCT Pub. No.: WO2008/066233
PCT Pub. Date: Jun. 5, 2008

(65) Prior Publication Data
US 2010/0071074 A1  Mar. 18, 2010

(30) Foreign Application Priority Data
Nov. 29, 2006  (KR) .................. 10-2006-0119209

(51) Int. Cl.
*G06F 21/00* (2006.01)

(52) U.S. Cl. .............. 705/902; 726/30; 705/59; 705/51; 705/901

(58) Field of Classification Search .............. 726/30; 705/51, 59, 901–902
See application file for complete search history.

(56) References Cited

U.S. PATENT DOCUMENTS

| | | | |
|---|---|---|---|
| 2002/0156712 A1* | 10/2002 | Rambhia | 705/36 |
| 2003/0126086 A1 | 7/2003 | Safadi | |
| 2004/0093337 A1* | 5/2004 | Shen et al. | 707/100 |
| 2004/0168184 A1* | 8/2004 | Steenkamp et al. | 725/31 |
| 2005/0021467 A1* | 1/2005 | Franzdonk | 705/51 |

(Continued)

FOREIGN PATENT DOCUMENTS

KR  1020020019806 A  3/2002

(Continued)

OTHER PUBLICATIONS

"Approved Document No. 6, WD 2.1 Technical Reference: Terminology, Phase II", The Digital Media Project, Nov. 11, 2005, all pages. http://www.dmpf.org.*

(Continued)

*Primary Examiner* — James A Reagan
*Assistant Examiner* — Calvin Cheung
(74) *Attorney, Agent, or Firm* — Ladas & Parry LLP

(57) ABSTRACT

Provided are an apparatus for executing interoperable digital rights management (DRM) using a contents device and a method of performing an operation between the contents device and a DRM tool for interoperable DRM, and more particularly, a method and apparatus for executing a DRM tool in various environments, regardless of the type of device or type of DRM tool, using an interfaced DRM executing apparatus including a DRM processor or a DRM tool agent.

12 Claims, 7 Drawing Sheets

U.S. PATENT DOCUMENTS

| | | | |
|---|---|---|---|
| 2005/0075998 A1* | 4/2005 | Huang et al. .................... 707/1 |
| 2005/0271205 A1* | 12/2005 | Shen et al. .................... 380/201 |
| 2006/0206311 A1* | 9/2006 | Jeong et al. .................... 704/10 |
| 2007/0083659 A1* | 4/2007 | Ji et al. .................... 709/227 |
| 2008/0097919 A1* | 4/2008 | Szucs .................... 705/52 |
| 2008/0134167 A1* | 6/2008 | Chae et al. .................... 717/173 |

FOREIGN PATENT DOCUMENTS

| | | |
|---|---|---|
| KR | 1020040056638 A | 7/2004 |
| KR | 1020050114187 A | 12/2005 |
| KR | 1020060011763 A | 2/2006 |
| WO | 03/021965 A1 | 3/2003 |
| WO | 03/075576 A2 | 9/2003 |

OTHER PUBLICATIONS

Bumsum Choi et. al., "A Tool Pack Mechanism for DRM Interoperability", ETRI Journal, vol. 29, No. 4, Aug. 2007, all pages.*

Seong Oun Hwang et. al., "Interoperable DRM Framework for Multiple Devices Environment", ETRI Journal, vol. 30, No. 4, Aug. 2008, all pages.*

"Approved Document No. 3 Technical Specification: Interoperable DRM Platform", The Digital Media Project, Apr. 15, 2005. http://www.dmpf.org.*

International Search Report—mailed Sep. 17, 2007; PCT/KR2007/003273.

* cited by examiner

FIG. 5

Content Player Module

```
Content Player ()
{
    DRMProcessor = LoadDRMProcessor();
    result = DRMProcessor.InstantiateTool();
    If(result==FAIL)
        { Do Some Error Process}
    … … … … … … …
    ReceiveStream();
    … … … … … … …
    Result = DRMProcessor.SendData(ControlPointID, InBuffer, OutBuffer);
    … … … … … …
    Decode(); or Store();
    … … … … … …
    Render();
}
```

FIG. 6

DRM Processor Module

```
Int InstantiateTool (ToolPackID, ControlPointIDList, OpaqueData)
{
    Locate Tool Pack and Parse it.
    ToolAgent = LoadToolAgent();
    result = ToolAgent.ReceiveMessage(DRMProcessorInstance, inMessage, outMessage);
    ... ... ... ... ...
    return result;
}
Int ReceiveMessage (Sender, inMessage, outMessage)
{
    Parse_inMessage(inMessage);
    if(Message_tag==NotifyToolEvent){ do something }
    else if(Message_tag==InitAuthenticate){ do something }
    else if(Message_tag==MutualAuthenticate){ do something }
    else if(Message_tag==CanProcess){ do something }
    ... ... ... ... ...
    return result;
}
Int SendData (ControlPointID, InBuffer, OutBuffer)
{
    ... ... ... ... ...
    return result;
}
```

FIG. 7

DRM Tool Agent Module

```
Int ReceiveMessage (Sender, inMessage, outMessage)
{
    Parse_inMessage(inMessage);
    if(Message_tag==Initialize){ do something }
    else if(Message_tag==MutualAuthenticate){ do something }
    else if(Message_tag==ConnectTool){ do something }
    … … … … … …
    return result;
}
Int SendData (ControlPointID, InBuffer, OutBuffer)
{
    … … … … … …
    return result;
}
```

APPARATUS FOR EXECUTING INTEROPERABLE DIGITAL RIGHTS MANAGEMENT USING CONTENTS DEVICE AND METHOD OF PERFORMING OPERATIONS BETWEEN CONTENTS DEVICE AND DIGITAL RIGHTS MANAGEMENT TOOL FOR INTEROPERABLE DIGITAL RIGHTS MANAGEMENT

TECHNICAL FIELD

The present invention relates to a method of performing an operation between a contents device and a digital rights management (DRM) tool in order to use multimedia contents, and more particularly, to a method and apparatus for executing a DRM tool in various environments, regardless of the type of device or type of DRM tool, using an interfaced DRM executing apparatus including a DRM processor or a DRM tool agent.

BACKGROUND ART

The present invention relates to copyright protection for digital contents, i.e., digital rights management (DRM). DRM refers to any technology used to protect the interests of copyright owners of contents and services, and digital contents from unauthorized use in order to protect the interests of contents providers and digital products from copyright infringement via the production, distribution, and management of contents including fee charging and payment. DRM includes digital copyright management technology by which an authorized user only uses contents and pays a reasonable fee, software and security technology for copyright authentication and execution, and payment technology.

A survival policy and technical approach for this digital era have been attempted so that digital contents can simultaneously provide end users with the maximum satisfaction and contents providers and distributors with stable profits in the future. Accordingly, 25 companies including British Telecom (UK), Fraunhofer Gesellschaft (DE), MPEGAL (US), Telecom Italia (IT), ERTI, and the like, from 11 countries, are joining the digital media project (DMP) technical specifications organization. The DMP was established in December of 2003 in order to develop standards for interoperable DRM.

Conventional DRM designed for a specific user device environment needs to be ported to a device since there are a variety of user device environments. In addition, a ported DRM or a method of porting DRM depends on a DRM tool or an institution providing DRM. In particular, users cannot use contents that have been moved to another device.

The present invention provides a method of performing an operation between a device platform and a DRM tool so that contents to which a specific DRM tool is applied can be used by using a variety of devices. Accordingly, device manufacturers do not need to design a device for specific DRM, and DRM tool developers do not need to port their DRM tools in a variety of device environments.

DISCLOSURE OF INVENTION

Technical Problem

The present invention provides an apparatus for performing interoperable digital rights management (DRM) using a contents device and a method of performing an operation between the contents device and a DRM tool for interoperable DRM.

Technical Solution

According to an aspect of the present invention, there is provided an apparatus for executing interoperable digital rights management (DRM) using a contents device, the apparatus comprising: a DRM processor receiving information on a DRM tool including a control point to which the DRM tool included in contents is applied from a contents player and searching for the DRM tool in the contents device or in an externally connected server based on the information on the DRM tool; a DRM agent existing in the DRM tool, receiving the information on the DRM tool by communicating with the DRM processor, loading a DRM tool library, and connecting a library function of the DRM tool to the control point whose location is included in the information on the DRM tool; and a contents player calling the DRM processor, transmitting the contents to the DRM tool agent so as to apply the DRM tool to the contents, and decoding the contents.

According to another aspect of the present invention, there is provided a method of performing an operation between a contents device and a DRM tool for interoperable DRM, the method comprising: (a) a contents player loading a DRM processor in order to DRM-process contents that are to be used; (b) the contents player sending information on a DRM tool including information on the location of a control point to which the DRM tool included in contents is applied to the DRM processor; (c) the DRM processor searching for the DRM tool in the contents device or in an externally connected server based on the information on the DRM tool; (d) a DRM tool agent existing in the DRM tool receiving the information on the DRM tool from the DRM processor; (e) the DRM tool agent loading a DRM tool library and connecting a library function of the DRM tool to the control point whose location is included in the information on the DRM tool; and (f) the contents player calling the DRM processor, transmitting the contents to the DRM tool agent to apply the DRM tool to the contents, and decoding the contents.

Advantageous Effects

The present invention performs operation mechanisms among a contents player, a DRM processor, a DRM tool agent, and a DRM tool library so that contents users can move contents without having to convert the contents in a variety of devices, thus increasing user convenience. Furthermore, since device manufacturers can manufacture a device based on the operation mechanism between the contents player and the DRM processor defined in the present invention, they do not need various kinds of DRM technologies. Since DRM tool developers provide their own DRM tool libraries and DRM tool agents, they do not need to port DRM tools according to device environments that have various platforms.

DESCRIPTION OF DRAWINGS

FIG. 5 is a diagram of an execution module of a contents player according to an embodiment of the present invention;

FIG. 6 is a diagram of an execution module of a DRM processor according to an embodiment of the present invention; and FIG. 7 is a diagram of an execution module of a DRM tool agent according to an embodiment of the present invention.

BEST MODE

According to an aspect of the present invention, there is provided an apparatus for executing interoperable digital rights management (DRM) using a contents device, the apparatus comprising: a DRM processor receiving information on a DRM tool including a control point to which the DRM tool included in contents is applied from a contents player and searching for the DRM tool in the contents device or in an externally connected server based on the information on the DRM tool; a DRM agent existing in the DRM tool, receiving the information on the DRM tool by communicating with the DRM processor, loading a DRM tool library, and connecting a library function of the DRM tool to the control point whose location is included in the information on the DRM tool; and a contents player calling the DRM processor, transmitting the contents to the DRM tool agent so as to apply the DRM tool to the contents, and decoding the contents.

According to another aspect of the present invention, there is provided a method of performing an operation between a contents device and a DRM tool for interoperable DRM, the method comprising: (a) a contents player loading a DRM processor in order to DRM-process contents that are to be used; (b) the contents player sending information on a DRM tool including information on the location of a control point to which the DRM tool included in contents is applied to the DRM processor; (c) the DRM processor searching for the DRM tool in the contents device or in an externally connected server based on the information on the DRM tool; (d) a DRM tool agent existing in the DRM tool receiving the information on the DRM tool from the DRM processor; (e) the DRM tool agent loading a DRM tool library and connecting a library function of the DRM tool to the control point whose location is included in the information on the DRM tool; and (f) the contents player calling the DRM processor, transmitting the contents to the DRM tool agent to apply the DRM tool to the contents, and decoding the contents.

MODE FOR INVENTION

Hereinafter, the present invention will be described more fully with reference to the accompanying drawings, in which exemplary embodiments of the invention are shown.

Figure 1:
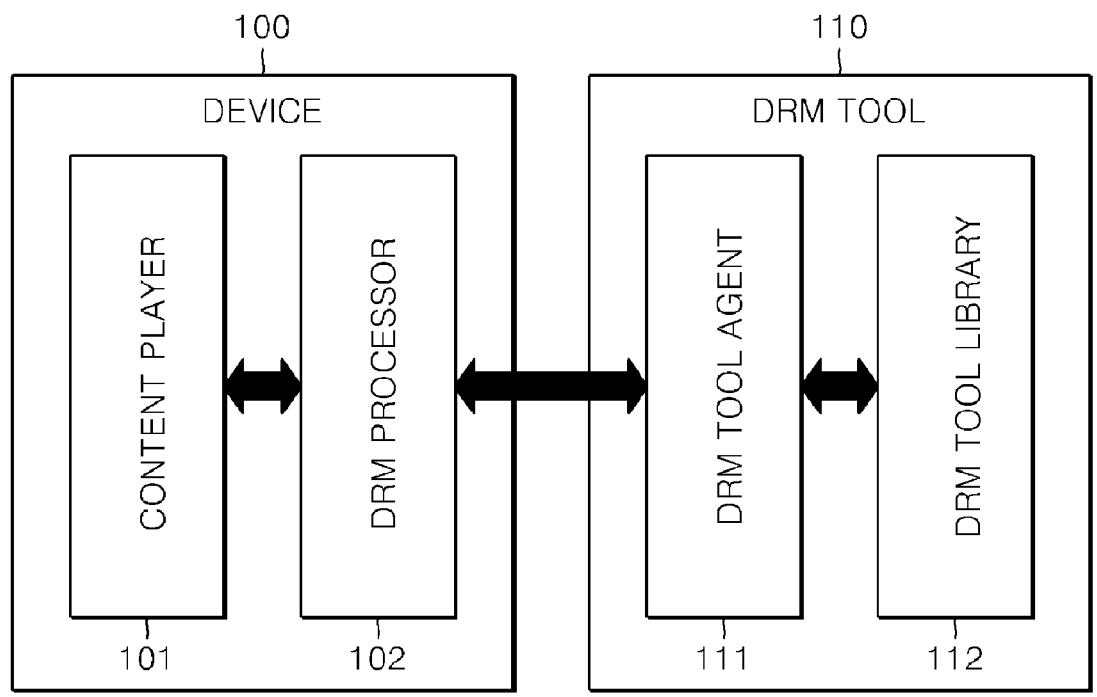
FIG. 1 is a block diagram illustrating a relationship between a device and a digital rights management (DRM) tool according to an embodiment of the present invention.

FIG. 1 is a block diagram illustrating the relationship between a device 100 and a digital rights management (DRM) tool 110 according to an embodiment of the present invention. Referring to FIG. 1, the relationship between the device 100 and the DRM tool 110 of the present embodiment includes two types of operation mechanisms between a content player 101 and a DRM processor 102 and between the DRM processor 102 and a DRM tool agent 111.

The DRM tool is used to protect digital contents from unauthorized use and manage them using up-to-date technologies such as encryption/decryption, authentication, watermarking, etc. The DRM tool is divided into a passive DRM tool and an active DRM tool. In order to reproduce the digital contents to which the DRM tool is applied it is necessary to exactly approach a control point to which the DRM tool is applied. For example, the control point is an input end of a reproducing device, and front and back end control points decode compressed digital contents.

The passive DRM tool that is found by the reproducing device is applied to a control point. The reproducing device searches for its own control point and applies the active DRM tool to its own control point.

Referring to FIG. 1, the contents player 101 calls the contents processor 102 from the device 100, searches the DRM tool 110 previously applied to the contents, and communicates with a DRM tool agent 111 in the DRM tool 110. The DRM tool agent 111 applies the DRM tool 110 necessary for the contents using the DRM tool library 112.

Figure 2:
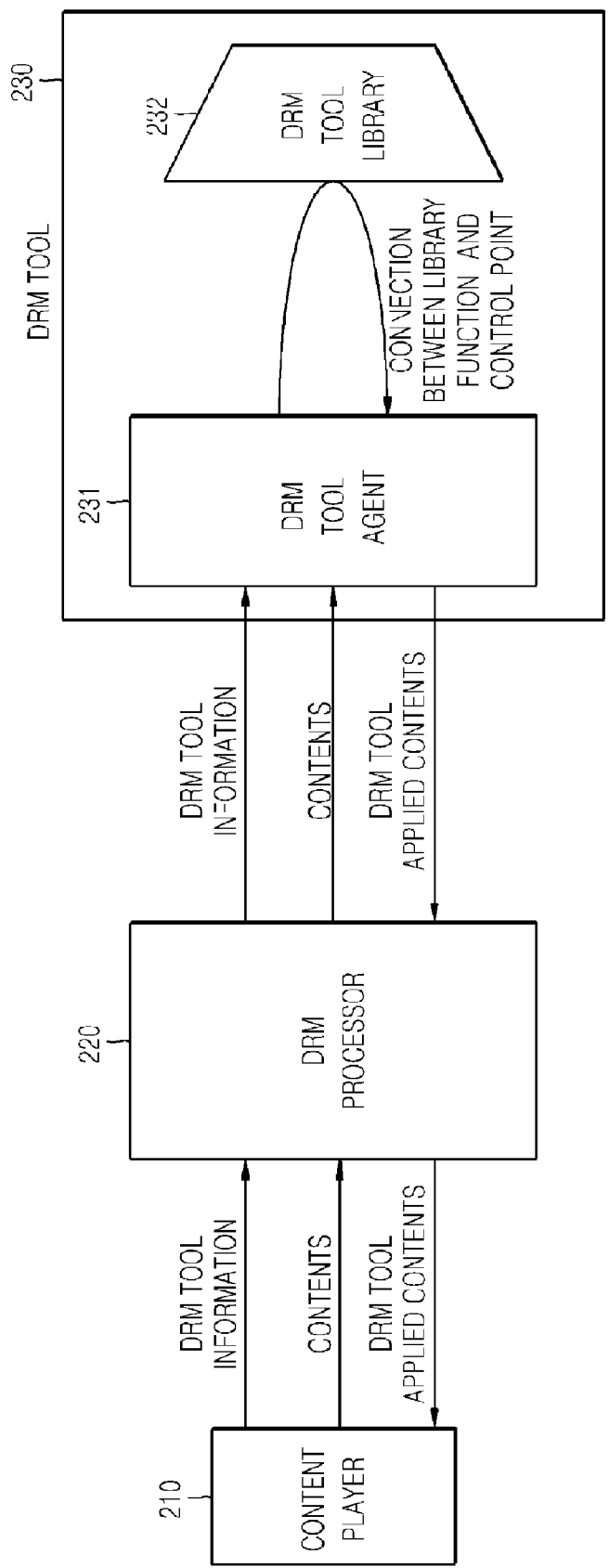
FIG. 2 is a diagram illustrating a data communication process between the device and the DRM tool according to an embodiment of the present invention.

FIG. 2 is a diagram illustrating a data communication process between the device and the DRM tool according to an embodiment of the present invention. Referring to FIG. 2 illustrating the operation mechanism illustrated in FIG. 1 in more detail, a contents player 210 and a DRM processor 220 share DRM information and contents between each other. The contents player 210 transfers to the DRM processor 220 information on a DRM tool which was previously applied to the contents. The DRM processor 220 requests a DRM tool agent 231 to transfer the information on the DRM tool to the DRM tool agent 231. The DRM tool agent 231 is connected to a library function for applying a subsequent DRM tool using a DRM tool library 232.

Then the content player 210 transfers the contents to the DRM tool agent 231 via the DRM processor 220 in order to apply the DRM tool again. The DRM tool agent 231 applies the DRM tool to the contents and transfers a result of the application to the contents player 210 via the DRM processor 220.

Figure 3:
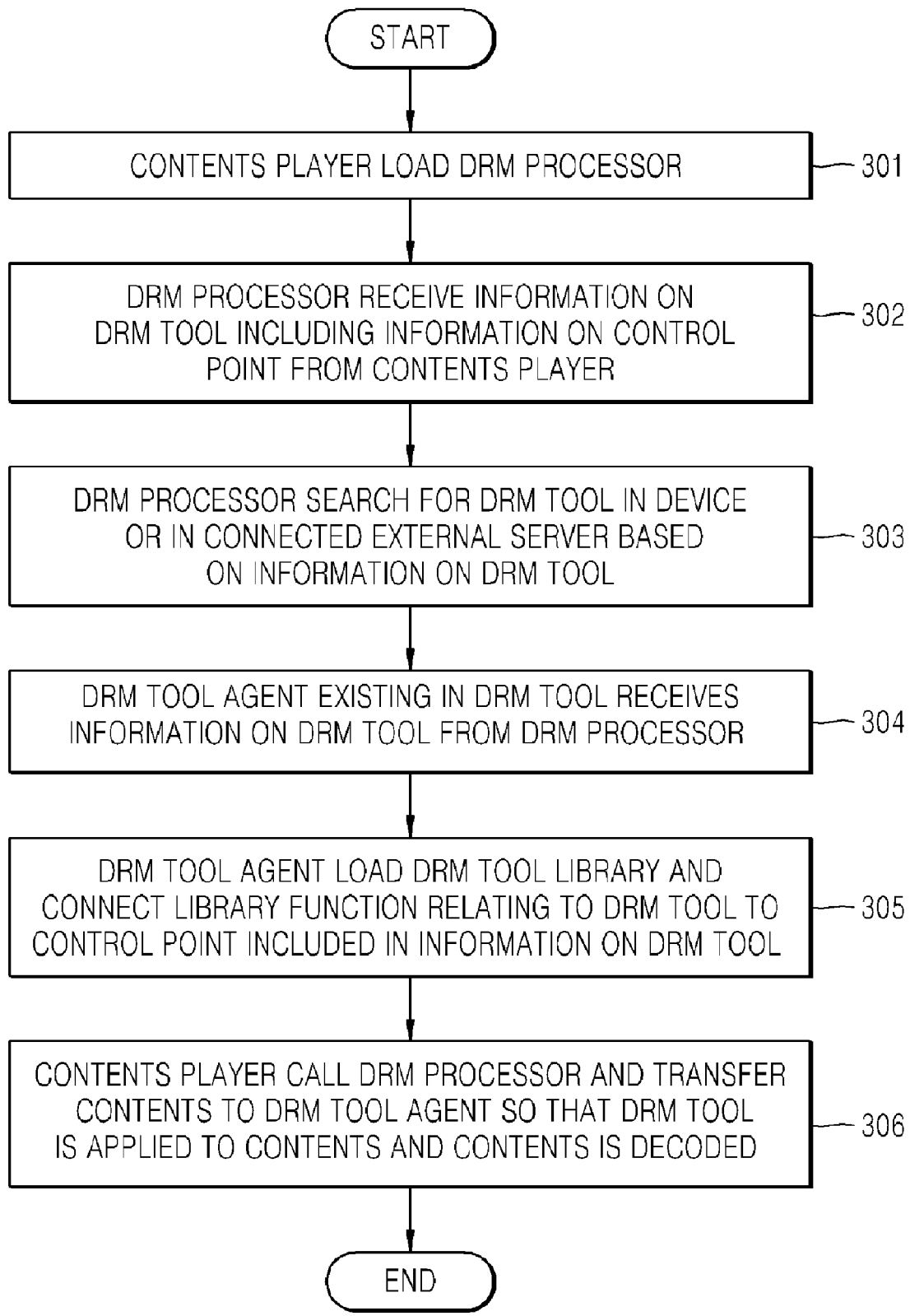
FIG. 3 is a flowchart of a method of applying a DRM tool of a device to contents according to an embodiment of the present invention.

FIG. 3 is a flowchart illustrating a method of applying a DRM tool of a device to contents according to an embodiment of the present invention. Referring to FIG. 3, if a contents player loads a DRM processor in order to DRM-process the contents (Operation 301), the DRM processor receives information on a DRM tool including information on a control point from the contents player (Operation 302). The DRM processor searches for the DRM tool in the device or in a connected external server based on the information on the DRM tool (Operation 303). A DRM tool agent existing in the DRM tool receives the information on the DRM tool from the DRM processor (Operation 304). The DRM tool agent loads a DRM tool library and connects the library function of the DRM tool to the control point included in the information on the DRM tool (Operation 305).

Then the contents player calls the DRM processor and transfers the contents to the DRM tool agent so that the DRM tool is applied to the contents and the contents is decoded (Operation 306).

Figure 4:
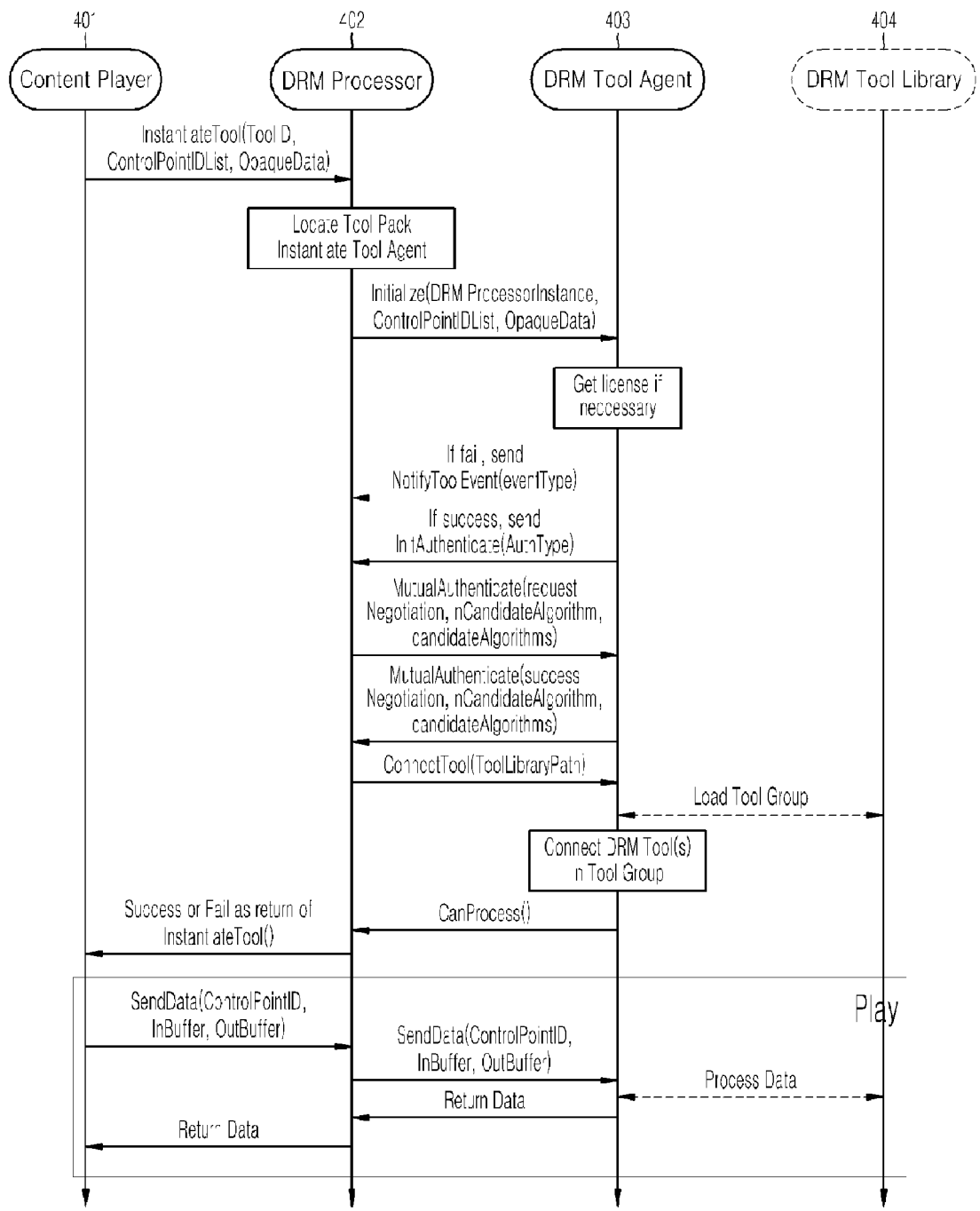
FIG. 4 is a diagram illustrating operation mechanisms among a contents player, a DRM processor, a DRM tool agent, and a DRM tool library according to an embodiment of the present invention.

FIG. 4 is a diagram illustrating operation mechanisms among a contents player 401, a DRM processor 402, a DRM tool agent 403, and a DRM tool library 404 according to an embodiment of the present invention. Referring to FIG. 4, the contents player 401 loads the DRM processor 402 and calls an InstantiateTool method. The InstantiateTool method includes a Tool ID, a Control Point ID List, and Opaque Data of a DRM tool applied to contents and are transferred as a parameter. The Control Pint ID indicates a control point (e.g., audio decoder front end, audio decoder rear end, etc.) into which a tool is inserted and operated during a media decoding process. The Opaque Data can include parameter information for initializing the DRM tool.

The DRM processor 402 that executes the InstantiateTool method searches a tool necessary for the Tool ID from a device and loads the DRM tool agent 403. After the DRM tool agent 403 is loaded, the DRM processor 402 transmits an Initialize message to the DRM tool agent 403. The Initialize message includes a DRM Processor Instance, a Control Point ID List, and Opaque Data. The DRM Processor Instance is a memory address necessary for transmitting a message generated by the DRM tool agent 403 to the DRM processor 402. The Control Point ID List and the Opaque Data are information received from the contents player 401.

The DRM tool agent 403 that receives the Initialize message determines if all control points that are to be used by the DRM tool agent 403 can be supported, determines if the Opaque Data is valid, and if it is determined that all control points can be supported and the Opaque Data is valid, requests the DRM processor 402 for mutual authentication. If it is determined that all control points cannot be supported and the Opaque Data is invalid, the DRM tool agent 403 sends a NotifyToolEvent message to the DRM processor 402. The DRM processor 402 uses eventType included in the NotifyToolEvent message to determine a type of an event.

The DRM tool agent 403 transmits an InitAuthenticate message to the DRM processor 402 in order to perform the mutual authentication between the DRM processor 402 and the DRM tool agent 403. The InitAuthenticate message includes an AuthType value defining a level of the mutual authentication. The DRM processor 402 confirms the level of the mutual authentication and transmits a MutualAuthenticate message to the DRM tool agent 403. The MutualAuthenticate message includes a requestNegotiation value which is a flag indicating a process of requesting the mutual authentication, a successNegotiation value which is a flag indicating the success of the mutual authentication, an nCandidateAlgorithm value indicating the number of available authentication algorithms, and a candidateAlgorithm value indicating the name of a substantial algorithm. The DRM processor 402 and the DRM tool agent 403 receive and send the MutualAuthenticate message between each other until the mutual authentication is completed.

If the mutual authentication is completed, the DRM processor 402 transmits a ConnectTool message to the DRM tool agent 403. The ConnectTool message includes location information (Tool Library Path) of the DRM tool library 404. The DRM tool agent 403 loads the DRM tool library 404 and connects each function of the DRM tool library 404 to an appropriate control point. If the connection is completed, the DRM tool agent 403 transmits a CanProcess message to the DRM processor 402 and informs the DRM processor 402 that data processing is prepared. The DRM processor 402 informs the contents player 401 that the data processing is completely prepared via a return value of the InstantiateTool method.

The contents player 401 calls a SendData method of the DRM processor 402 from each control point with regard to audio/video data. The DRM processor 402 calls a SendData method of the DRM tool agent 403 from each control point with regard to the audio/video data. The SendData method includes parameters such as Control Point ID indicating which control point transfers the audio/video data, in Buffer containing real audio/video data, and outBuffer containing audio/video data that is DRM tool processed. The SendData is repeatedly called until a contents file is completed. The DRM tool agent 403 applies the DRM tool to the contents file called by using the SendData method via the DRM tool library 404. The contents file is transmitted to the contents player 401 as a return value through the DRM processor 402.

A specific embodiment of the present invention will now be described using a similar code.

FIG. 5 is a diagram of an execution module of a contents player according to an embodiment of the present invention. Referring to FIG. 5, the execution module of the contents player calls a LoadDRMPocessor that loads a DRM processor and calls an InstantiateTool method for transmitting information on a DRM tool. The execution module calls a SendData method, sends contents to which the DRM tool is to be applied to a DRM tool agent, and applies the DRM tool to the contents.

FIG. 6 is a diagram of an execution module of a DRM processor according to an embodiment of the present invention. Referring to FIG. 6, the DRM processor, which is module embedded in a device and performs DRM functions, searches for a DRM tool, parses information on the DRM tool, operates the DRM tool, and communicates a message with the DRM tool. If the device has no DRM tool, the DRM processor connects to an external server and downloads a DRM tool. The DRM processor controls the contents (such as playing of the contents, recording of the contents, transmitting of the contents, etc.) using the contents player and interface.

Referring to FIG. 6, the execution module of the DRM processor searches for the DRM tool in the device or in the external server by using an InStantiateTool method and communicates with a DRM tool agent existing in the DRM tool. The execution module parses a received message by using a ReceiveMessage method and analyzes the message to perform mutual authentication with the DRM tool agent in order to prepare an environment for applying the DRM tool. The execution module transmits received contents to the DRM tool agent by using a SendData method when the contents player calls the DRM processor, receives a result value, and transmits the result value to the contents player.

FIG. 7 is a diagram of an execution module of a DRM tool agent according to an embodiment of the present invention. Referring to FIG. 7, the DRM tool agent performs mutual authentication with a DRM processor by using a ReceiveMessage method, and applies a DRM tool, and transmits a result value to what? by using a SendData method.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion. Also, functional programs, code and code segments for accomplishing the present invention can be easily construed by programmer skilled in the art to which the present invention pertains.

The present invention performs operation mechanisms among a contents player, a DRM processor, a DRM tool agent, and a DRM tool library so that contents users can move contents without having to convert the contents in a variety of devices, thus increasing user convenience. Furthermore, since device manufacturers can manufacture a device based on the operation mechanism between the contents player and the DRM processor defined in the present invention, they do not need various kinds of DRM technologies. Since DRM tool developers provide their own DRM tool libraries and DRM tool agents, they do not need to port DRM tools according to device environments that have various platforms.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention provides an apparatus for performing interoperable digital rights management (DRM) using a contents device and a method of performing an operation between the contents device and a DRM tool for interoperable DRM.

The invention claimed is:

1. An apparatus for executing interoperable digital rights management (DRM) for each of a plurality of different content devices, the apparatus comprising:
   each of the plurality of different content devices further comprises:
      a DRM processor receiving information on a DRM tool by a processor including a control point to which the DRM tool included in contents is applied from a contents player and searching for the DRM tool in the respective different content device or in an externally connected server based on the information on the DRM tool;
      a DRM agent existing in the DRM tool, receiving the information on the DRM tool by communicating with the DRM processor, loading a DRM tool library, and connecting a library function of the DRM tool to the control point whose location is included in the information on the DRM tool; and
      a contents player calling the DRM processor, transmitting the contents to the DRM tool agent so as to apply the DRM tool to the contents, and decoding the contents, and
      wherein the contents player is configured to be generated from at least two or more of the different content devices.

2. The apparatus of claim 1, wherein the DRM processor further parses the information on the DRM tool and operates the DRM tool in order to perform message communication.

3. The apparatus of claim 1, wherein the DRM tool agent receives the information on the DRM tool from the DRM processor, determines if the DRM tool can be applied to the contents based on the information on the DRM tool, if it is determined that the DRM tool can be applied, performs mutual authentication with the DRM processor, loads the DRM tool library, and connects the library function of the DRM tool to the control point included in the information on the DRM tool.

4. A method of performing an operation between a plurality of content devices and a DRM tool for interoperable DRM, the method comprising:
   each of the plurality of different content devices further comprises:
      (a) a contents player loading a DRM processor by a processor in order to DRM-process contents that are to be used;
      (b) the contents player sending information on a DRM tool including information on the location of a control point to which the DRM tool included in contents is applied to the DRM processor;
      (c) the DRM processor searching for the DRM tool in the respective different content device or in an externally connected server based on the information on the DRM tool;
      (d) a DRM tool agent existing in the DRM tool receiving the information on the DRM tool from the DRM processor;
      (e) the DRM tool agent loading a DRM tool library and connecting a library function of the DRM tool to the control point whose location is included in the information on the DRM tool; and
      (f) the contents player calling the DRM processor, transmitting the contents to the DRM tool agent to apply the DRM tool to the contents of the respective different device, and decoding the contents,
      wherein the contents player is from at least two or more of the different content devices, and
      wherein the content player for each of the different content devices uses a different DRM tool.

5. The method of claim 4, wherein in operation (c), the DRM processor parses the information on the DRM tool so as to search for the DRM tool in the contents device or in the externally connected server based on the parsed information on the DRM tool and operates the DRM tool in order to perform message communication.

6. The method of claim 4, wherein in operation (b), the information on the DRM tool includes a number of the DRM tool and parameter information for initializing the DRM tool,
   in operation (c), the DRM processor searches the DRM tool based on the number of the DRM tool included in the information on the DRM tool,
   in operation (d), the DRM tool agent receives the information on the DRM tool and initializes the DRM tool agent based on the parameter information included in the information on the DRM tool.

7. The method of claim 4, wherein operation (e) further comprises:
   (e-1) the DRM tool agent determining if the DRM tool can be applied to the contents based on the information on the DRM tool;
   (e-2) if it is determined that the DRM tool can be applied, the DRM tool agent performing mutual authentication with the DRM processor;
   (e-3) if the mutual authentication is completely performed, the DRM processor transmitting a DRM tool connection request message to the DRM tool agent; and
   (e-4) the DRM tool agent that receives the DRM tool connection request message loading a DRM tool library and connecting the library function of the DRM tool to the control point whose location is included in the information on the DRM tool.

8. The method of claim 7, wherein in operation (e-1), the determining of whether the DRM tool can be applied to the contents is made by determining if the control point whose location is included in the information on the DRM tool can be supported and if the parameter information for initializing the DRM tool is valid.

9. The method of claim 7, wherein in operation (e-2), the mutual authentication is performed after the DRM tool agent transmits a message including a value defining a level of the mutual authentication to the DRM processor, and the DRM processor transmits a response message including at least one of a mutual authentication request process, a value indicating success of the mutual authentication, the number of available authentication algorithms, and information on an authentication algorithm.

10. The method of claim 7, wherein in operation (e-3), the DRM tool connection request message includes information on the location of the DRM tool library, and in operation (e-4), the DRM tool agent loads the DRM tool library using the information on the location of the DRM tool library and connects the library function of the DRM tool to the control point whose location is included in the information on the DRM tool.

11. The method of claim 4, wherein in operation (f), the contents player calls the DRM processor at each control point of the contents, transmits the contents and information on the control point to the DRM tool agent to apply the DRM tool to the contents, and decodes the contents.

12. A method of performing an operation between a contents device and a DRM tool for interoperable DRM, the method comprising:
   (a) a contents player loading a DRM processor in order to DRM-process contents that are to be used;
   (b) the contents player sending information on a DRM tool including information on the location of a control point to which the DRM tool included in contents is applied to the DRM processor;
   (c) the DRM processor searching for the DRM tool in the contents device or in an externally connected server based on the information on the DRM tool;
   (d) a DRM tool agent existing in the DRM tool receiving the information on the DRM tool from the DRM processor;
   (e) the DRM tool agent loading a DRM tool library and connecting a library function of the DRM tool to the control point whose location is included in the information on the DRM tool; and
   (f) the contents player calling the DRM processor, transmitting the contents to the DRM tool agent to apply the DRM tool to the contents, and decoding the contents,
wherein operation (e) further comprises:
(e-1) the DRM tool agent determining if the DRM tool can be applied to the contents based on the information on the DRM tool;
(e-2) if it is determined that the DRM tool can be applied, the DRM tool agent performing mutual authentication with the DRM processor, and
wherein the mutual authentication is performed after the DRM tool agent transmits a message including a value defining a level of the mutual authentication to the DRM processor, and the DRM processor transmits a response message including at least one of a mutual authentication request process, a value indicating success of the mutual authentication, the number of available authentication algorithms, and information on an authentication algorithm;
(e-3) if the mutual authentication is completely performed, the DRM processor transmitting a DRM tool connection request message to the DRM tool agent; and
(e-4) the DRM tool agent that receives the DRM tool connection request message loading a DRM tool library and connecting the library function of the DRM tool to the control point whose location is included in the information on the DRM tool.

* * * * *